(12) United States Patent
Howard et al.

(10) Patent No.: US 7,182,292 B2
(45) Date of Patent: Feb. 27, 2007

(54) WIDE SPREADER BAR AND LIFT-UP SEAT SPREADER BAR FOR SEAT LEGS

(75) Inventors: Daniel J Howard, Bothell, WA (US); Kevin S Callahan, Shoreline, WA (US); Samuel J Feist, Bellevue, WA (US); Bradley J Mitchell, Snohomish, WA (US); Trevor M Laib, Woodinville, WA (US); James T Henley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 10/898,729

(22) Filed: Jul. 23, 2004

(65) Prior Publication Data

US 2006/0016944 A1 Jan. 26, 2006

(51) Int. Cl.
*B64D 11/06* (2006.01)

(52) U.S. Cl. .............................. 244/122 R; 244/118.6

(58) Field of Classification Search ............. 244/118.5, 244/118.6, 122 R, 131, 129.1; 439/210, 439/110, 131; 174/10, 70 R, 74 R, 209, 174/15.7; 297/344.1, 217.4; 296/63.13
See application file for complete search history.

(56) References Cited

U.S. PATENT DOCUMENTS

| 4,428,078 | A | | 1/1984 | Kuo |
| 4,763,360 | A | | 8/1988 | Daniels et al. |
| 4,853,555 | A | | 8/1989 | Wheat |
| 4,936,527 | A | * | 6/1990 | Gorges ..................... 244/118.6 |
| 6,527,566 | B1 | * | 3/2003 | Lambiaso ................... 439/131 |
| 6,601,798 | B2 | * | 8/2003 | Cawley ................... 244/118.6 |
| 6,619,588 | B2 | * | 9/2003 | Lambiaso ................ 244/118.5 |

* cited by examiner

*Primary Examiner*—Galen Barefoot
(74) *Attorney, Agent, or Firm*—Harness, Dickey & Pierce, P.L.C.

(57) ABSTRACT

A seat having a seat leg assembly for use on a mobile platform, especially on an aircraft. The seat comprises a front seat leg, a rear seat leg, and a spreader bar coupled to and extending between the front seat leg and the rear seat leg. The spreader bar has a door. The door is movable between a closed position in which the door prevents access to areas beneath the spreader bar and an open position in which the door permits access to areas beneath the spreader bar. In this manner, the open door allows an installer to grasp electrical cabling beneath the spreader bar and feed the cabling through a hole in the door so that the cable can be connected a connection point on or adjacent to the seat track.

20 Claims, 4 Drawing Sheets

WIDE SPREADER BAR AND LIFT-UP SEAT SPREADER BAR FOR SEAT LEGS

FIELD OF THE INVENTION

The present invention relates generally to mobile platform passenger seats. In particular, the present invention relates to an aircraft passenger seat having a spreader bar that extends between two seat legs, the spreader bar being movable to permit access to areas below the spreader bar that house cabling.

BACKGROUND OF THE INVENTION

Commercial aircraft operators and passengers are increasingly requesting in-flight entertainment (IFE) and electrical power outlets to enable passengers and/or crew members to operate various personal electronic devices, such as laptop computers, at their seats. To provide passengers and/or crew members with such features, electrical power and data must be delivered to each seat. Power and data are delivered to aircraft passenger seats via one or more cables that extend from a power or data source to the passenger seats. The cables typically extend through one or more seat tracks recessed within the floor of the aircraft passenger cabin. The seat track is covered by a seat track cover.

The passenger seats are mounted to the passenger cabin floor via the same seat track that the power/data cables extend through. Connection between pig-tail cables of the seats and the cables within the seat track is made in a variety of different ways. For example, a hole is often made in the seat track cover so that either the cables within the seat track or the cables of the seats can pass through the hole to mate with each other.

In view of the foregoing, it would be highly desirable to provide a seat support structure that provides even easier and more convenient access to cabling used to supply power, or to enable data transfer, between a given seat and its associated seat track.

SUMMARY OF THE INVENTION

In one preferred form the present invention provides for a seat leg assembly for a mobile platform seat comprising a front seat leg, a rear seat leg, and a spreader bar extending between the front seat leg and the rear seat leg. The spreader bar has a door. The door is movable between a closed position in which the door prevents access to areas beneath the spreader bar and an open position in which the door permits access to areas beneath the spreader bar.

The invention further provides for a mobile platform seat comprising a seat base and a seat leg assembly extending from the seat base. The seat leg assembly includes a front seat leg, a rear seat leg, and a spreader bar extending between the front seat leg and the rear seat leg. The spreader bar includes a door portion, a first stationary portion, a second stationary portion, and an opening between the first stationary portion and the second stationary portion. The door is movable between a closed position in which the door covers the opening and an open position in which the door at least partially exposes the opening.

The invention still further provides for a method for gaining access to areas beneath a spreader bar that extends between two seat legs of a mobile platform seat. The method comprises moving a door of the spreader bar from a closed position in which the door obstructs access to areas beneath the spreader bar to an open position in which the door permits access to areas beneath the spreader bar.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
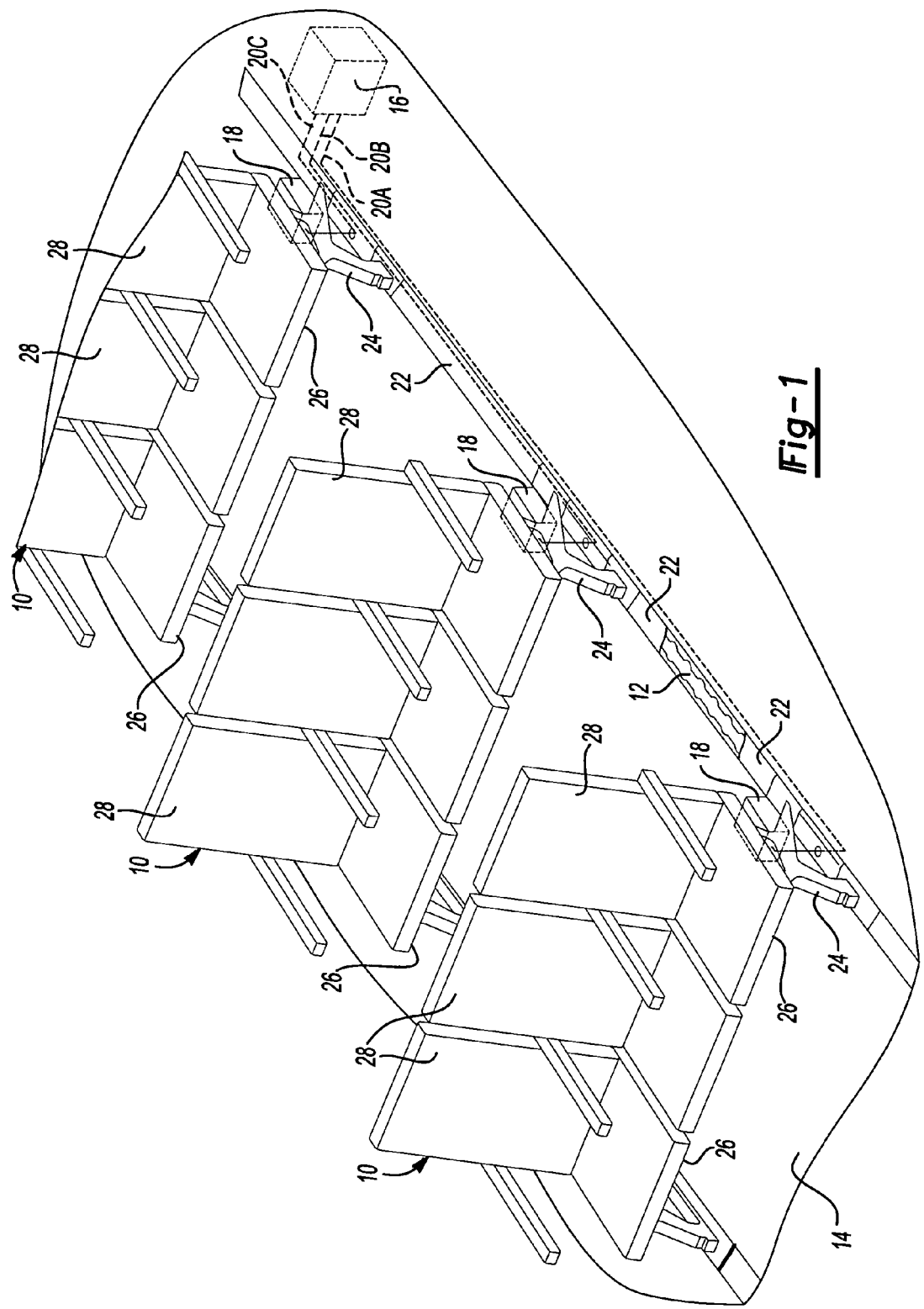
FIG. 1 is a perspective view of a number of aircraft passenger seat groups each having seat legs with a spreader bar according to the present invention.

With initial reference to FIG. 1, a number of mobile platform seats, in this example aircraft passenger seat groups, according to a preferred embodiment of the present invention, are illustrated at 10. It will be appreciated, however, that the present invention is not limited to use only in aircraft and aircraft passenger seats, but can be implemented in any form of mobile platform such as a ship, train, bus, motor-craft, etc., as well as on any stationary platform, such as in theatre seats and stadium seats.

The seat groups 10 each cooperate with a seat track 12 to secure the seat groups 10 to a floor 14 of an aircraft passenger cabin. A power/data source 16 supplies power and/or data that is transferred to a seat electronic unit (SEU) 18 of each seat group 10 in any suitable manner, such as via a series of cables 20A through 20C. Each cable 20A through 20C provides power or data to a different one of the seat electronic units 18. Further, power or data can also be supplied to each SEU 18 in any other suitable manner, such as by a conductor rail, which is fully described in U.S. Pat. No. 4,853,555 titled "Electrical Power Transfer System For Aircraft Passenger Entertainment System" and is incorporated herein by reference. Still further, the seat groups 10 could be wired in a "daisy chain" fashion in which each seat group 10 is wired to a neighboring seat group 10. The portions of the seat track 12 between two of the seat groups 10 are covered by a seat track cover 22.

Each seat group 10 includes a pair of seat leg assemblies 24. Each seat leg assembly 24 extends downward from a seat base 26 of one of a plurality of individual seats 28 of each seat group 10. The seat leg assemblies 24 are secured to the seat track 12 to mount the seat groups 10 to the floor 14 of the passenger cabin.

With additional reference to FIG. 2, each seat leg assembly 24 includes a front leg 30, a rear leg 32, a reinforcement beam 34, and a spreader bar 36. The front leg 30 extends from a front portion of the seat base 26 at an approximately right angle to the seat base 26. The front leg 30 includes an upper portion 38 that is secured to the seat base 26 and a lower portion 40 that is opposite the upper portion 38. The lower portion 40 includes one or more seat studs 42 that extend from the terminus of the lower portion 40.

The rear leg 32 extends from a rear portion of the seat base 26. The rear leg 32 includes an upper portion 44 and a lower portion 46. The upper portion 44 is secured to the seat base 26. The lower portion 46 is opposite the upper portion 44 and includes one or more seat studs 48. The rear leg 32 is generally curved such that the lower portion 46 is not aligned directly beneath the upper portion 44. Instead, the lower portion 46 is further from the front leg 30 than the upper portion 44.

The reinforcement beam 34 extends between the front leg 30 and the rear leg 32. The reinforcement beam 34 can be unitary with the front leg 30 and the rear leg 32 or it can be fastened to the front leg 30 and the rear leg 32 in any suitable manner. As illustrated, the reinforcement beam 34 extends between the front leg 30 and the rear leg 32 at an angle. However, the reinforcement beam 34 can also extend between the legs 30 and 32 parallel to the passenger cabin floor 14. The reinforcement beam 34 can be of any suitable shape, such as circular or planar.

The spreader bar 36 also extends between the front leg 30 and the rear leg 32. Specifically, the spreader bar 36 extends between the lower portion 40 of the front leg 30 and the lower portion 46 of the rear leg 32. The spreader bar 36 is generally an elongated panel having edges 50 that extend along the length of the spreader bar 36. The edges 50 are curved downward and away from the upper portions 40 and 46 towards the floor 14. The width of the spreader bar 36 is generally greater than the width of the seat track 12.

The spreader bar 36 includes a stationary portion 52 and an actuating door portion 54. The door 54 can be substantially planar with the other portions of the spreader bar 36 as illustrated or the door 54 can be located within a box or a shroud that extends from the spreader bar 36. The door 54 has an opening in the form of a through hole 56. As illustrated, the hole 56A is positioned generally in the center of the door 54. However, the hole 56 can be positioned at any suitable position in the door 54 or the spreader bar 36, such as at one of the edges 50 of the door 54 or in the stationary portion 52 as the hole 56B is.

Figure 2A:
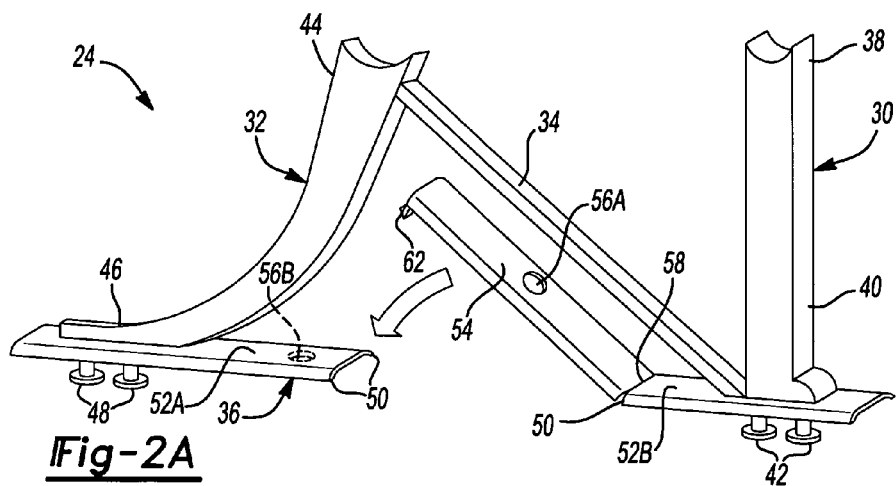
FIG. 2A is a perspective view of one of the seat legs having a spreader bar according to an embodiment of the present invention.
Figure 2B:
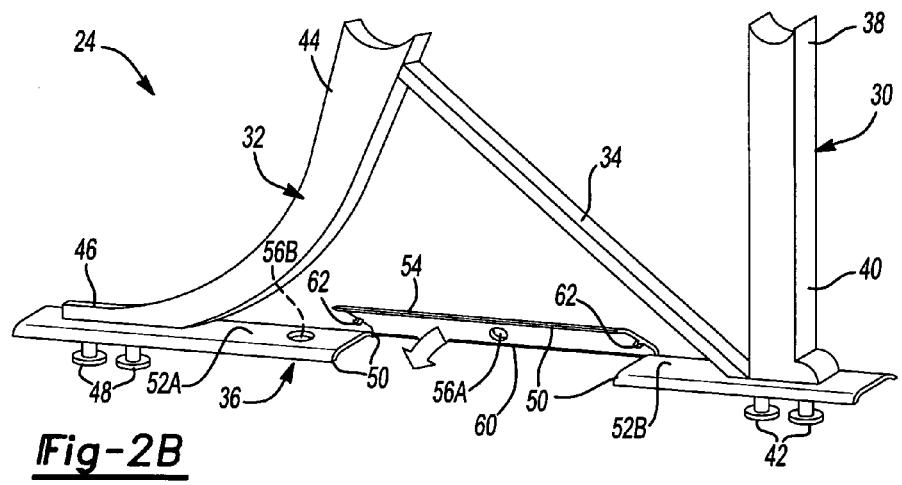
FIG. 2B is a perspective view of one of the seat legs having a spreader bar according to another embodiment of the present invention.

The door 54 opens to provide access to areas below the spreader bar 36. With reference to FIG. 2A, actuation of the door 54 between a closed position in which the door 54 and the stationary portion 52 are in the same horizontal plane and an open position (FIG. 2A) is provided by a hinge 58 that extends along the width of the spreader bar 36. As illustrated in FIG. 2b, a hinge 60 that extends along the length of the spreader bar 36 can also be used to permit actuation of the door 54 between an open position (FIG. 2b) and a closed position in which the stationary portion 52 and the door 54 are in the same plane.

The hinges 58 and 60 can be any suitable hinge, such as a shaft hinge or a living hinge. The shaft hinge includes a rod or shaft that extends through a slot in the door 54. The rod or shaft is anchored to the spreader bar 36. The door 54 pivots about the rod or shaft to provide actuation between the open position and the closed position. The living hinge is typically made of molded plastic having a flex point at the hinges 58 or 60 to permit actuation of the door 54 between the open position and the closed position.

As illustrated in FIG. 2, the door 54 further includes one or more locking tabs 62. The tabs 62 are operable to engage an undersurface of the stationary portion 52 to lock the door in the closed position. The tabs 62 are flexible tabs that disengage the stationary portion 52 to permit movement to the open position when upward force is applied to the door 54. The tabs 62 can take the form of any suitable fastening device, but are typically flexible plastic tab shaped portions that extend from the door 54.

Figure 3:
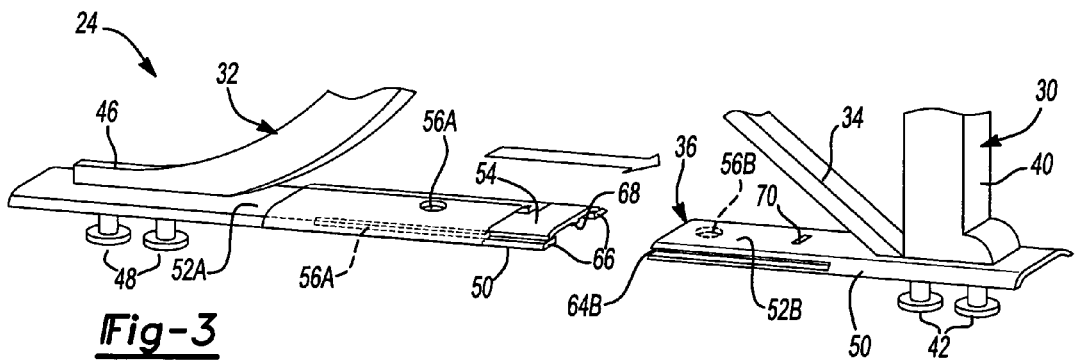
FIG. 3 is a perspective view of one of the seat legs having a spreader bar according to yet an additional embodiment of the present invention.

With additional reference to FIG. 3, access to regions beneath the spreader bar 36 can also be provided by sliding the door 54 from a closed position to an open position. The stationary portion 52 includes a first stationary portion 52A and a second stationary portion 52B defining an opening or a gap between the first and second stationary portions 52A and 52B. The gap is covered by the door 54 when the door 54 is in the closed position. As illustrated in FIG. 3, if the door 54 is a sliding door the spreader bar 36 includes a recessed track 64 having a first portion 64A located on the first stationary portion 52A and a second portion 64B located on the second stationary portion 52B. The door portion 54 includes rails 66 that protrude from an inner surface of the door 54 and extend along at least a portion of the length of the door 54. The rails are sized and shaped to cooperate with the recessed track 64.

The sliding door 54 of FIG. 3 includes a locking flange 68 that takes the place of the locking tab 62. The locking flange 68 extends from an undersurface of the door 54. The second stationary portion 52B includes a locking recess 70 that is sized to receive the locking flange 68.

In the closed position, the door 54 is positioned such that the rails 66 cooperate with portions of the recessed track 64 on both the first stationary portion 52A and the second stationary portion 52B to cover the open gap in the spreader bar between the first and second stationary portions 52A and 52B. To lock the door 54 in the closed position, the door 54 is positioned so that the locking flange 68 is seated within the locking recess 70 of the second stationary portion 52B.

To permit access to areas below the spreader bar 36, the door 54 is moved from the closed position to the open position of FIG. 3. To move the door 54 to the open position, a sliding force is applied to the door 54 to move the locking flange 68 from engagement with the locking recess 70 and to slide the door 54 over the first stationary portion 52A. Sliding the door 54 over the first stationary portion 52A exposes the gap between the first and second stationary portions 52A and 52B to permit access to areas beneath the spreader bar 36.

Figure 4:
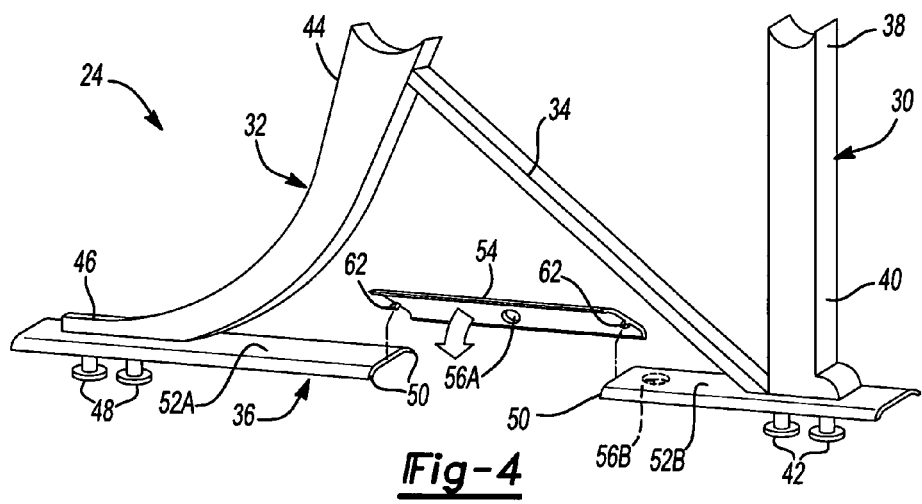
FIG. 4 is a perspective view of one of the seat legs having a spreader bar according to still another embodiment of the present invention.

With additional reference to FIG. 4, access to regions beneath the spreader bar 36 can also be provided by completely removing the door 54 from the spreader bar 36. As illustrated in FIG. 4, the door 54 can be a separate and independent part from the spreader bar 36 that is not permanently secured to the spreader bar 36. The door 54 is seated between the first and second stationary portions 52A and 52B to prevent access to areas beneath the spreader bar 36. The door 54 includes the tabs 62, which cooperate with the spreader bar 36 to hold the door 54 in the closed position between the first and second stationary portions 52A and 52B.

To move the door 54 of FIG. 4 to the open position in which it does not cover the gap between the first and second stationary portions 52A and 52B, the door 54 is pulled upward and away from the spreader bar 36 to break the contact between the tabs 62 and the spreader bar 36 and remove the door 54 from its position between the first and second stationary portions 52A and 52B. To prevent the door 54 from becoming lost when it is moved to the open position, the door 54 can include a lanyard (not shown) that is secured to the spreader bar 36.

The seat leg assembly 24 can be made of any suitable material, such as a metal alloy, that is of a sufficient strength to support the weight of the seat group 10 and the passengers/articles seated on the seats 28. The spreader bar 36 and the spreader bar door 54 are typically made of formed metal alloys or formed polymers, but other suitably strong materials can also be used.

Figure 5:
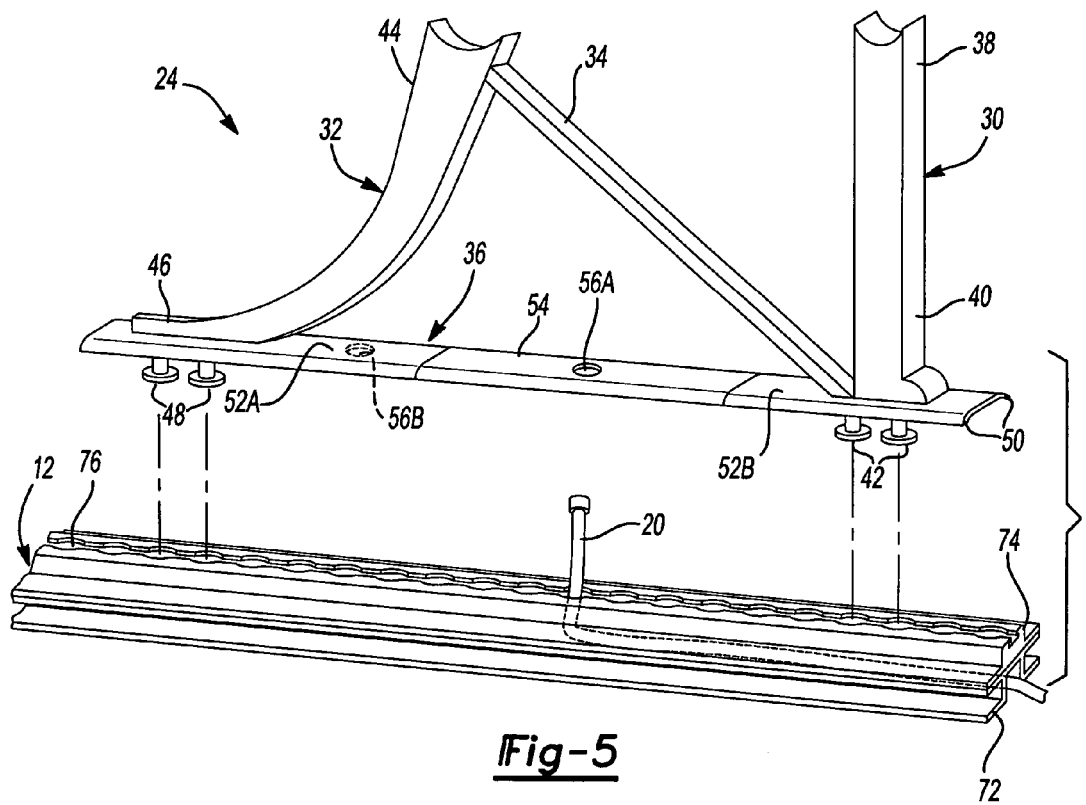
FIG. 5 is a perspective view of one of the seat legs having a spreader bar according to the invention, a seat track configured to cooperate with the seat leg, and a data/power cable extending to the seat leg.
Figure 6:
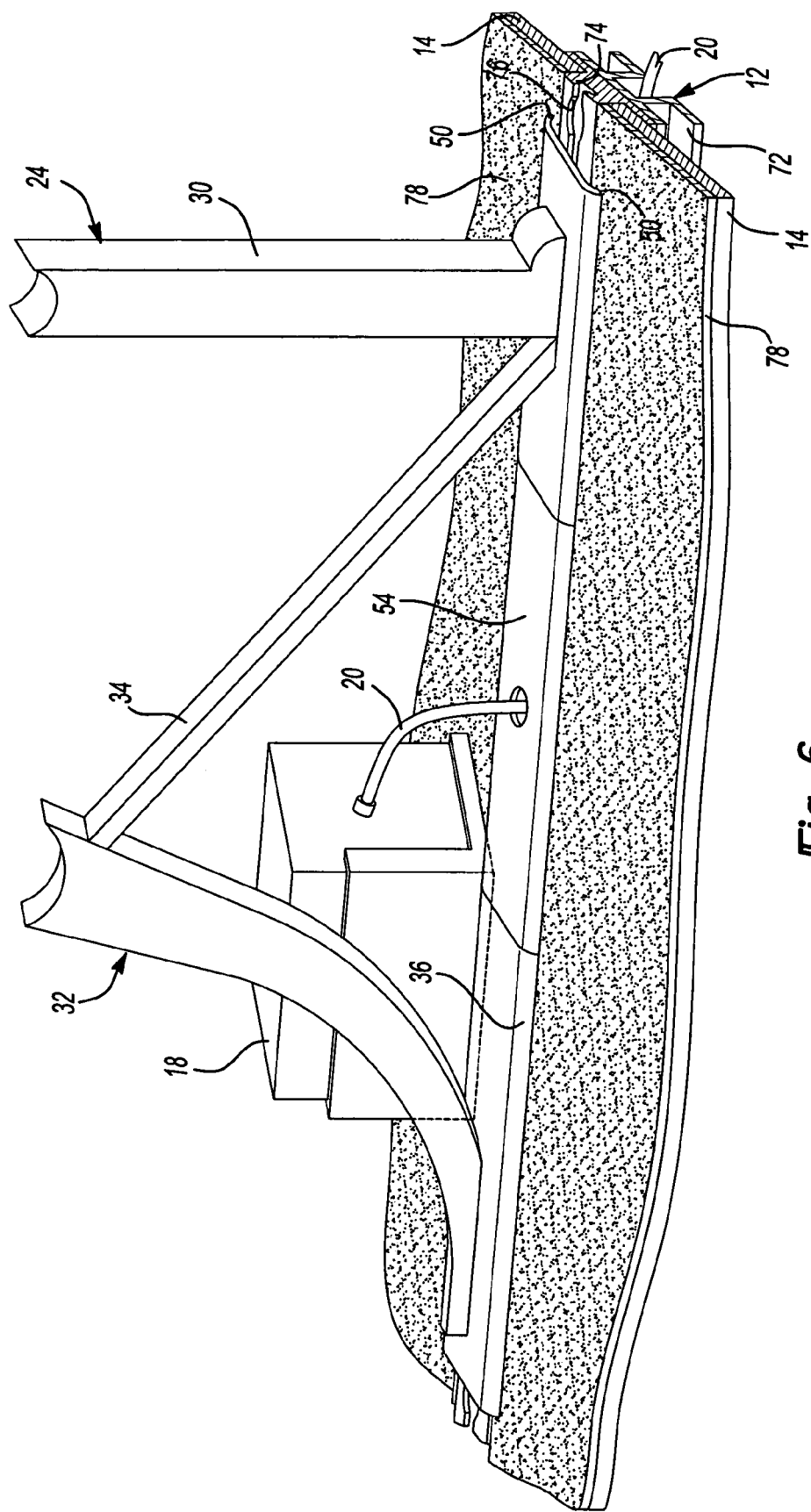
FIG. 6 is a perspective view of the seat leg of FIG. 5 secured to the seat track and the data/power cable extending through the spreader bar to cooperate with a seat electronic unit of the seat group.

With additional reference to FIGS. 5 and 6, the seat track 12 generally includes a base 72 and a seat track crown 74. The base 72 is secured to a fuselage floor beam (not shown) in any suitable manner to secure the seat track 12 beneath the floor 14. The crown 74 includes a series of circular apertures 76 that receive and secure the seat studs 42 and 48.

As illustrated in FIGS. 5 and 6, the cables 20 extend through the seat track 12 to the different seat groups 10. Before or after the seat leg assembly 24 is secured to the seat track 12, the door 54 is opened in any of the ways described above depending upon the type of the door 54 provided to allow an installer to grasp the cable 20 and thread the cable 20 through the hole 56. The cable 20 is then attached to the SEU 18 to permit the transfer of power and/or data between the seats 28, via the SEU 18, and the power/data source 16.

The SEU 18 is mounted to at least one seat leg assembly 24 of each seat group 10. The SEU 18 is mounted to the seat leg assembly 24 using any suitable fastening device or system. The SEU 18 is surrounded by an SEU shroud (not shown) that protects the SEU 18 from being damaged. The SEU 18 is in cooperation with various user interfaces (not shown) of the seat assembly 10, such as passenger audio and video systems.

With reference to FIG. 6, the spreader bar 36 is of such a width that when the seat leg assembly 24 is secured to the seat track 12, the spreader bar 36 entirely covers the seat track 12 and a portion of the floor 14, which is usually covered by a carpet 78. The curved edges 50 of the spreader bar 36 extend downward to contact the carpeting 78. Because the spreader bar 36 covers the seat track 12 and a portion of the carpeting 78 surrounding the seat track 12, the spreader bar 36 prevents foreign objects from entering the seat track 12.

While the above invention is described in terms of using the spreader bar door 54 to gain access to the cables 20 that extend along the seat track 12 and threading one or more of the cables 20 through the hole 56 of the door 54, it must be understood that the spreader bar door 54 can be opened to gain access to any type of wiring device, wiring system, or any other component that is positioned along or near the seat track 12. Further, the hole 56 in the door 54 can be modified to permit passage of any other wire or wiring system in addition to the cables 20.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A seat comprising:
a seat leg assembly, said seat leg assembly including:
a front seat leg;
a rear seat leg;
a spreader bar extending between said front seat leg and said rear seat leg, said spreader bar having an opening at an intermediate portion of a length thereof; and
a door adapted to cover said opening, said door having a width generally in accordance with a width of said spreader bar and disposed to be generally longitudinally aligned with said spreader bar when said door is secured to said spreader bar in a closed position;
wherein said door is movable between said closed position in which said door prevents access to areas beneath said spreader bar and an open position in which said door permits access to areas beneath said spreader bar.

2. The seat of claim 1, wherein said door includes a hinge that extends along a width of said spreader bar to permit the movement between the closed position and the open position.

3. The seat of claim 1, wherein said door includes a hinge that extends along a length of said spreader bar to permit the movement between the closed position and the open position.

4. The seat of claim 1, wherein said spreader bar further includes a stationary portion having a recessed track and said door includes a pair of rails that cooperate with said recessed track to permit movement of said door between the open position and the closed position.

5. The seat of claim 1, wherein said door includes a locking feature to secure said door in the closed position.

6. The seat of claim 1, wherein said door is entirely removed from said spreader bar when in the open position.

7. The seat of claim 1, wherein said door includes a hole that extends through the door that is operable to permit passage of a cable through said door.

8. The seat of claim 1, wherein said spreader bar further comprises edges that extend downward from said spreader bar toward a passenger cabin floor to which said seat leg assembly is mounted.

9. The seat of claim 1, wherein said spreader bar further comprises a stationary portion that does not move with said door; and
wherein said stationary portion includes a hole that extends through said stationary portion and is operable to permit passage of a cable through said stationary portion.

10. A seat comprising:
a seat base;
a seat leg assembly extending from said seat base including:
a front seat leg;
a rear seat leg;
a spreader bar extending between said front seat leg and said rear seat leg, said spreader bar including:
a door portion having a width generally in accordance with a width of said spreader bar and disposed to be generally longitudinally aligned with said spreader bar when said door is secured to said spreader bar in a closed position;
a first stationary portion;
a second stationary portion; and an opening between said first stationary portion and said second stationary portion;

wherein said door is movable between said closed position in which said door covers said opening and an open position in which said door at least partially exposes said opening.

11. The seat of claim 10, wherein said door includes a hinge that extends along a width of said spreader bar to permit the movement between the closed position and the open position.

12. The seat of claim 10, wherein said door includes a hinge that extends along a length of said spreader bar to permit the movement between the closed position and the open position.

13. The seat of claim 10, wherein said first and said second stationary portions include a recessed track and said door includes a pair of rails that cooperate with said recessed track to permit movement of said door between the open position and the closed position.

14. The seat of claim 10, wherein said door includes a locking feature to secure said door in the closed position.

15. The seat of claim 10, wherein said door is entirely removed from said spreader bar when in the open position.

16. The seat of claim 10, wherein said door includes a hole that extends through said door that is operable to permit passage of a cable through said door.

17. The seat of claim 10, wherein said spreader bar further comprises edges that extend downward from said spreader bar toward a floor to which said seat leg assembly is mounted.

18. The seat of claim 10, wherein said door is secured to said spreader bar with a lanyard.

19. The seat of claim 10, wherein said door includes a hole that extends through at least one of said first stationary portion and said second stationary portion, said hole operable to permit passage of a cable.

20. A method of forming a seat, comprising:

forming two spaced apart legs for supporting a seat portion;

forming a spreader bar between the two legs;

forming an opening at an intermediate portion of a length of the spreader bar; and forming a door on the spreader bar that covers the opening and has a width generally in accordance with a width of the spreader bar, and is disposed to be generally longitudinally aligned with the spreader bar when the door is secured to the spreader bar in a closed position, the door being movable between an open position to permit access to areas beneath the spreader bar to connect a cable extending beneath the spreader bar to a connection point on or adjacent to the seat track, and the closed position to restrict access to the areas beneath the spreader bar.

* * * * *